United States Patent [19]
Clement et al.

[11] Patent Number: 5,528,860
[45] Date of Patent: Jun. 25, 1996

[54] GATE SCREW BACKUP SYSTEM

[75] Inventors: Conrad D. Clement, Rochester, Minn.; Dean A. Olson, Orchard; Donald J. Fenske, Cresco, both of Iowa

[73] Assignee: Featherlite Mfg., Inc., Cresco, Iowa

[21] Appl. No.: 231,038

[22] Filed: Apr. 22, 1994

[51] Int. Cl.⁶ .................................................. E05F 15/00
[52] U.S. Cl. .................................................. 49/139; 49/506
[58] Field of Search .............................. 49/139, 140, 506; 74/625

[56]         References Cited
       U.S. PATENT DOCUMENTS

| | | | |
|---|---|---|---|
| 1,858,624 | 5/1932 | Hess et al. .................................. | 74/625 |
| 2,366,734 | 1/1945 | Lear ........................................... | 49/140 X |
| 2,684,239 | 7/1954 | Gaffney ...................................... | 49/140 X |
| 2,719,036 | 9/1955 | Brundage ................................... | 49/140 X |

*Primary Examiner*—Jerry Redman
*Attorney, Agent, or Firm*—Merchant, Gould, Smith, Edell, Welter & Schmidt

[57] ABSTRACT

A backup system is provided for a gate screw assembly of a race car transport trailer. The gate screw assembly includes a pair of screws which are rotated by an electric motor and interconnecting linkage arms so as to raise and lower the gate. The backup system includes rotatable shafts operatively connected to the drive shaft of the motor. Upon failure of the motor, the shafts of the backup system can be rotated by a drill or a wrench, thereby rotating the motor drive shaft, the linkage arms, and the gate screws, so that the gate can be moved between the raised and lowered positions.

12 Claims, 2 Drawing Sheets

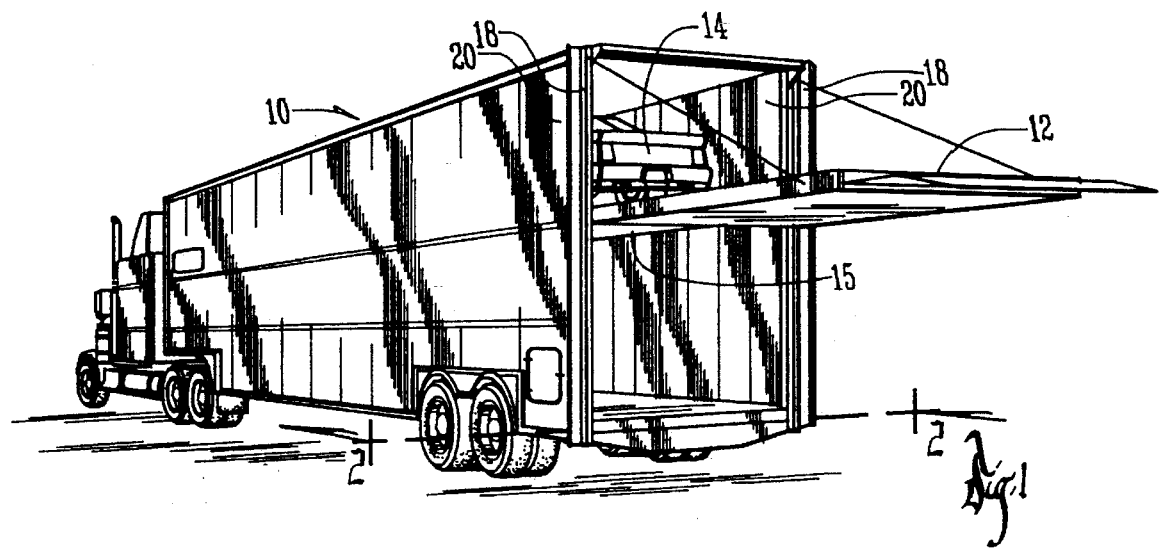
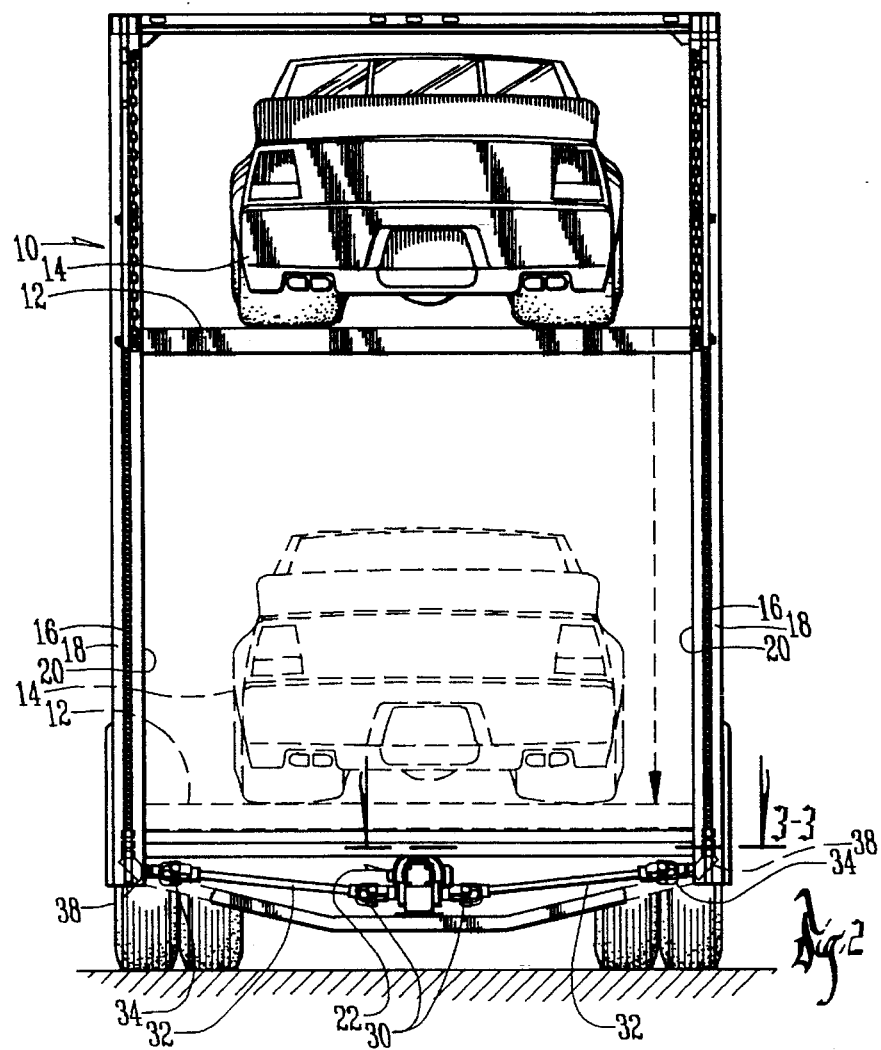

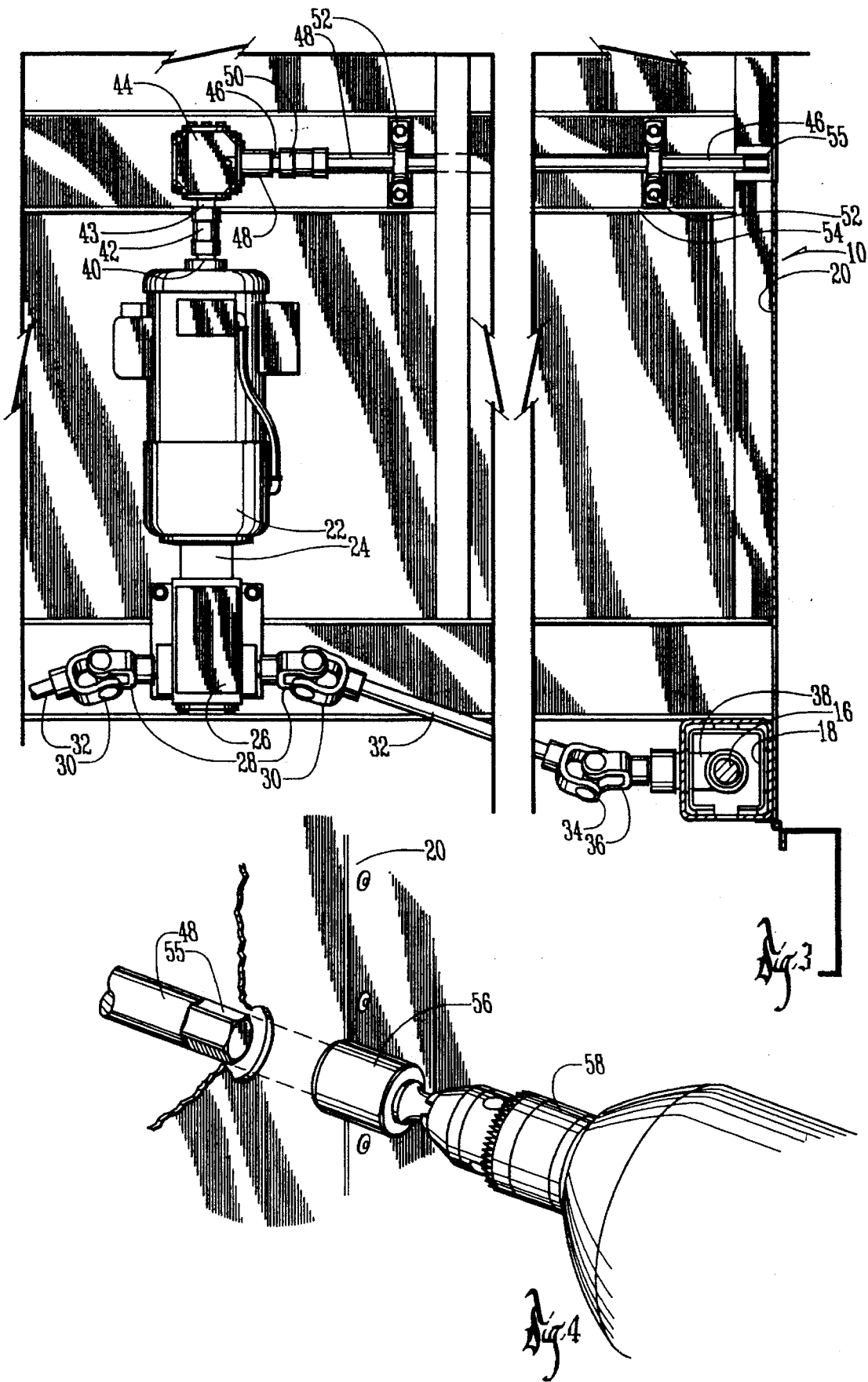

GATE SCREW BACKUP SYSTEM

BACKGROUND OF THE INVENTION

Race car transport trailers typically employ dual rotatable screws to raise and lower the rear gate or door of the trailer. The gate is raised and lowered, or moved between open and closed positions, by an electric motor, which has a drive shaft connected to the screws with appropriate linkage arms and gear boxes. The gate is capable of lifting a race car upwardly for storage upon a raised platform within the body of the trailer. If the motor fails, the gate cannot be moved, and the race car cannot be moved into or out of the trailer. Such failure of the motor presents drastic problems for the race car drivers and owners, who have been known to rip the gate from the trailer so that the car can be removed in time for a race. The time delays and expenses associated with motor failure are undesirable.

Therefore, a primary objective of the present invention is the provision of a backup system for the rear gate screw of a transport trailer gate.

Another objective of the present invention is the provision of a means and method for rotating a motor drive shaft when the motor is inoperative so that a gate can be raised and lowered.

Another objective of the present invention is the provision of a gate screw backup system which is quick and easy to operate, durable in use, and economical to manufacture.

These and other objectives will become apparent from the following description of the invention.

SUMMARY OF THE INVENTION

The gate screw backup system of the present invention includes a first shaft operatively connected to the drive shaft of an electric motor and in coaxial alignment with the drive shaft. A second shaft extends from the first shaft, with a gear box being disposed therebetween. The outer end of the second shaft has a polygonal cross sectional shape so as to receive a socket mounted on a drill or wrench. Upon actuation of the drill or wrench, the second shaft and connected first shaft are rotated, which in turn rotates the motor drive shaft. The motor drive shaft is connected to at least one rotatable screw upon which a gate is slidably tracked so as to move between open and closed position upon rotation of the screw via rotation of the drive shaft. Thus, if the motor fails, the drive shaft can still be rotated to turn the screw, and thereby raise or lower the gate, by operation of the drill or wrench which turns the first and second backup system shafts.

BRIEF DESCRIPTION OF THE DRAWINGS

FIG. 1 is a perspective view of a race car transport trailer having a rear gate movable between raised and lowered positions, with the gate being shown in a raised position.

FIG. 2 is a rear view of the trailer taken along lines 2—2 of FIG. 1, with the gate being in a raised position, as shown by solid lines, and with the broken lines showing the gate in a lowered position.

FIG. 3 is a partial top plan view taken along lines 3—3 showing the gate screw backup system of the present invention.

FIG. 4 is a perspective view showing the distal end of the backup system shaft.

DETAILED DESCRIPTION OF THE INVENTION

With reference to the drawings, a race car transport trailer is generally designated by the reference numeral 10. The trailer 10 includes a rear gate 12 which is movable between a raised position, as seen in FIG. 1 and as shown in solid lines in FIG. 2, and a lowered position, as shown in broken lines in FIG. 2. The gate 12 is adapted to lift a race car 14 for storage upon a raised shelf 15 within the trailer 10, and for lowering the car for removal from the shelf.

The gate 12 is mounted in a conventional manner at its opposite side edges to a pair of rotatable screws 16. The screws are housed within a C-shaped channel 18 at the rear end of the trailer 10 adjacent the opposite sides 20 thereof.

An electric motor 22 is provided for rotating the screws 16 through a series of linkages or interconnected shafts. More particularly, the motor 22 includes a drive shaft (not shown) which extends into an electric brake 24. The brake 24 has an output shaft (not shown) extending into a gear box 26. Preferably, the gear box 26 has a reduction ratio of 10:1. The gear box 26 has a pair of oppositely disposed output shafts which terminate in U-joints or yokes 28. In turn, yokes 28 are connected to yokes 30 on the inner ends of drive shafts 32. The outer ends of drive shafts 32 terminate in yokes 34 which are connected to yokes 36 mounted on the output shafts of a 90° gear box 38. The gear boxes 38 are operatively connected to the lower ends of the screws 16.

Upon actuation of the motor 22, the interconnected motor 22, gear box 30, drive shafts 32, and gear boxes 38 rotate the screws 16 such that the gate 12 is raised or lowered. The motor 22 is reversible such that rotation of the screws in one direction causes the gate 12 to slidably track along the screw flighting in an upper direction, and reversal of the motor causes the screws to rotate in the opposite direction such that the gate slidably tracks downwardly along the screw flighting.

The above description of the transport trailer gate and the screw assembly for raising and lowering the gate is conventional and does not constitute a part of the present invention.

The present invention is directed towards a backup system for the gate screw assembly. The backup system is best seen in FIG. 3, and includes a shaft 40 extending from the motor 22 in a direction opposite the motor drive shaft and co-axially aligned therewith. A flex coupler 42 interconnects the shaft 40 with a first shaft 43 extending from a gear box 44. Preferably, the gear box 44 has a 1:1 ratio. A second shaft 46 extending from the gear box 44 is connected to an elongated shaft 48 by a coupler 50. The shaft 48 is journaled within one or more pillow block bearings 52 secured to the frame or floor 54 of the trailer 10. The shaft 48 terminates in a distal end 55 adjacent one of the side walls 20 of the trailer 10, as seen in FIGS. 3 and 4. The end 55 of the shaft 48 has a polygonal shape adapted to receive a socket 56. The socket 56 can be mounted in a known manner to a conventional electric drill 58 or to a wrench (not shown).

In operation, when the drill 58 or wrench is actuated with the socket 56 matingly engaging the end 55 of the shaft 48, the shafts 48, 46 and 40 are rotated, so as to drive or rotate the drive shaft of the motor 22, which in turn rotates the shafts 32, thereby rotating the screws 16 so as to raise or lower the gate. Thus, with the backup system of the present invention, in the event that the motor 22 fails, the gate 12 can still be raised or lowered so that the race car 14 can be placed into or removed from the trailer 10.

It is understood that the screw backup system of the present invention can be utilized in other environments wherein a gate or door or other objects are raised and lowered, or opened and closed, by the rotation of the drive shaft of a motor. In such other applications, the backup system can override the failure of the motor so that the gate, door or object can be moved to a desired position.

Whereas the invention has been shown and described in connection with the preferred embodiments thereof, it will be understood that many modifications, substitutions, and additions may be made which are within the intended broad scope of the following claims. For example, the shaft 48 may extend to any access location on or under the trailer, and does not have to extend perpendicularly to the gear box shaft 40.

From the foregoing, it can be seen that the present invention accomplishes at least all of the stated objectives.

What is claimed is:

1. An improved screw system for moving a gate between open and closed positions, comprising:

at least one primary screw being operatively connected to the gate;

a motor having a drive shaft operatively connected to the screw for rotating the screw in a first direction to open the gate and in a second direction to close the gate;

a rotatable backup shaft having a first end operatively connected to the drive shaft in a direct drive relation, the backup shaft having a free end sized for selective engagement by a rotatable tool to cause rotation of the backup shaft, the connection between the drive shaft and the free and of the backup shaft being free from any clutch or disengagement mechanism wherein the backup shaft is in continuous rotatable connection with the drive shaft, whereby rotation of the backup shaft rotates the drive shaft to move the gate between the open and closed positions.

2. The system of claim 1 wherein the backup shaft includes a first section which is coaxially aligned witch the drive shaft.

3. The system of claim 2 wherein the backup shaft includes a second shaft section extending from the first section, with a gear box operatively connecting the first and second sections.

4. The system of claim 3 wherein the second section forms the free end and has an outer end being polygonal in cross section so as to be adapted to receive a socket for rotating the backup shaft.

5. The system of claim 3 wherein the second section extends substantially perpendicularly to the first section.

6. A backup system for a rear gate screw of a trailer having a rear gate movable between raised and lowered positions by a pair of rotatable screws attached to the gate, the screws being rotatable by an electric motor having a single drive shaft connected to both the screws by linkage arms, the backup system comprising:

a backup shaft operatively connected to the drive shaft in a direct drive relation; and rotation means for rotating the backup shaft so as to rotate the drive shaft, and thus the screws, to raise and lower the gate.

7. The backup system of claim 6 wherein the backup shaft includes a first shaft portion extending from the motor in a direction opposite to the drive shaft and being coaxial with the drive shaft.

8. The backup system of claim 7 wherein the backup shaft includes a second shaft portion extending from the first shaft portion in a substantially perpendicular direction, and wherein the rotation means includes the second shaft portion having a remote end adjacent a side of the trailer for receiving a socket to turn the second shaft portion, and thereby rotate the first shaft portion.

9. The backup system of claim 7 further comprising a gear box positioned between the first and second shaft portions.

10. The backup system of claim 6 wherein the rotation means includes the backup shaft having a free end sized for selective engagement by a rotatable tool to cause rotation of the backup shaft wherein the connection between the free end of the backup shaft and the drive shaft is free from any clutch or disengagement device wherein the backup shaft is in continuous rotatable connection with the drive shaft.

11. A method for raising and lowering a gate comprising:

providing at least one rotatable screw upon which the gate slidably tracks;

providing a motor having a drive shaft operatively connected to the screw for normally rotating the screw;

providing a backup shaft operatively connected at a first end to the drive shaft of the motor in a direct drive relation, the backup shaft having a free end sized for selective engagement by a rotatable tool to cause rotation of the backup shaft, the connection between the drive shaft and the free end of the backup shaft being free from any clutch or disengagement devices wherein the backup shaft is in continuous rotatable connection with the drive shaft; and rotating the backup shaft with a rotatable tool engaged with the free end of the backup shaft so as to rotate the drive shaft and thereby rotate the screw to raise or lower the gate.

12. The method of claim 11 wherein the backup shaft is rotated by a drill.

* * * * *

UNITED STATES PATENT AND TRADEMARK OFFICE
CERTIFICATE OF CORRECTION

PATENT NO. : 5,528,860

DATED : June 25, 1996

INVENTOR(S) : Clement et al.

It is certified that error appears in the above-identified patent and that said Letters Patent is hereby corrected as shown below:

In Claim 1, column 3, line 30, "and" should read --end--.

Signed and Sealed this

Eighth Day of October, 1996

*Attest:*

BRUCE LEHMAN

*Attesting Officer*   *Commissioner of Patents and Trademarks*